3,117,967
2-BIPHENYLYL-2-HYDROXY-MORPHOLINIUM
HALIDES
Elvin L. Anderson, Moorestown, and Donald E. Rivard, Haddonfield, N.J., assignors to Smith Kline & French Laboratories, Philadelphia, Pa., a corporation of Pennsylvania
No Drawing. Filed Apr. 2, 1962, Ser. No. 184,534
6 Claims. (Cl. 260—247.7)

This invention relates to novel biphenylyl substituted morpholine derivatives. More specifically, this invention relates to 2-biphenylyl-2-hydroxymorpholinium halides.

The novel morpholine derivatives of this invention are useful as antiviral agents, particularly against Herpes simplex, hepatitis ($MHV_3$) and influenza ($PR_8$) viruses.

The biphenylyl substituted morpholine derivatives are represented by the following fundamental structural formula:

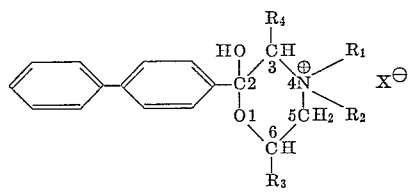

Formula I where:

$R_1$ represents lower alkyl, preferably methyl or ethyl;
$R_2$ represents lower alkyl, preferably methyl or ethyl, or hydroxyethyl;
$R_3$ and $R_4$ represent hydrogen or methyl; and
$X^\ominus$ represents a halide anion, such as chloride, bromide or iodide, preferably bromide.

Advantageous compounds of this invention are represented by Formula I when $R_1$ and $R_2$ are methyl or ethyl and $R_3$ and $R_4$ are hydrogen.

The morpholine derivatives of this invention are prepared by reacting a p-phenylphenacyl halide with a lower alkanolamine as illustrated by the following reaction sequence:

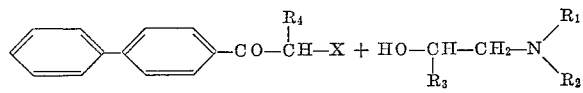

in which $R_1$, $R_2$, $R_3$, $R_4$ and X are as defined above for Formula I. Thus, the halide and alkanolamine are heated in an unreactive organic solvent, preferably chloroform, and advantageously at the reflux temperature for from one to five hours. Cooling separates the crystalline products in good yields. The reactants employed above are well known to the art.

The following specific examples illustrate the preparation of the novel compounds of this invention.

Example 1

To a solution of 55 g. of p-phenylphenacyl bromide in 200 ml. of chloroform at reflux is added dropwise with stirring a solution of 18 g. of 2-dimethylaminoethanol. The reaction mixture is refluxed for three hours. During the course of the reaction a white precipitate forms. The precipitate is collected from the cooled reaction mixture and recrystallized from ethanol to yield 2-biphenylyl-2-hydroxy-4,4-dimethylmorpholinium bromide, M.P. 187–189° C.

Example 2

To a solution of 55 g. of p-phenylphenacyl bromide in 200 ml. of chloroform at reflux is added dropwise a solution of 23.4 g. of diethylaminoethanol in 50 ml. of chloroform. The solution is refluxed until a white precipitate forms (2–3 hours). The white solid is filtered from the cooled mixture and recrystallized from an isopropyl alcohol-benzene mixture to give 2-biphenylyl-2-hydroxy-4,4-diethylmorpholinium bromide, M.P. 179–181° C.

Example 3

To a solution of 55 g. of p-phenylphenacyl bromide in 200 ml. of chloroform at reflux is added dropwise with stirring a solution of 24 g. of N-methyldiethanolamine in 50 ml. of chloroform. After one hour of refluxing, the product appears as an oil. Cooling, separation of the oil and addition of ether precipitates a solid which is recrystallized from an isopropyl alcohol-benzene mixture to yield 2-biphenylyl-2-hydroxy-4(2-hydroxyethyl) - 4 - methylmorpholinium bromide, M.P. 169–171° C.

Example 4

To a solution of 55 g. of p-phenylphenacyl bromide in 200 ml. of chloroform at reflux is added dropwise with stirring a solution of 20.6 g. of 1-dimethylamino-2-propanol in 50 ml. of chloroform. The mixture is refluxed for two hours and cooled. The product which precipitates is collected and recrystallized from a mixture of benzene-isopropyl alcohol to yield 2-biphenylyl-2-hydroxy-4,4,6-trimethylmorpholinium bromide, M.P. 159–162° C.

Example 5

To a solution of 53 g. of α-methyl-p-phenylphenacyl bromide in 100 ml. of chloroform at reflux is added dropwise with stirring a solution of 25 g. of N,N-dimethylaminoethanol in 50 ml. of chloroform. The solution is allowed to reflux for several hours until a white precipitate appears. The white solid is collected from the chilled reaction mixture and recrystallized several times from methanol to yield 2-biphenylyl-2-hydroxy-3,4,4-trimethylmorpholinium bromide, M.P. 230° C. (decomp.).

What is claimed is:
1. A chemical compound of the structural formula:

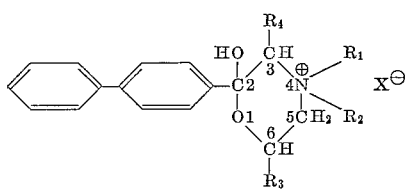

in which:
$R_1$ is a member selected from the group consisting of methyl and ethyl;
$R_2$ is a member selected from the group consisting of methyl, ethyl and hydroxyethyl;

$R_3$ and $R_4$ are members selected from the group consisting of hydrogen and methyl; and
$X^\ominus$ is a halide anion.

2. A chemical compound of the structural formula:

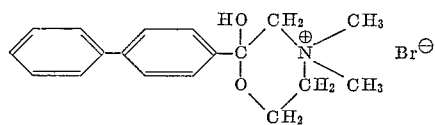

3. A chemical compound of the structural formula:

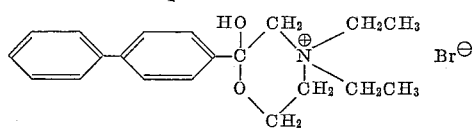

4. A chemical compound of the structural formula:

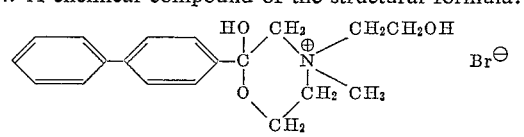

5. A chemical compound of the structural formula:

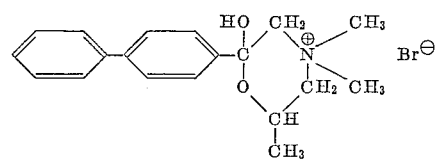

6. A chemical compound of the structural formula:

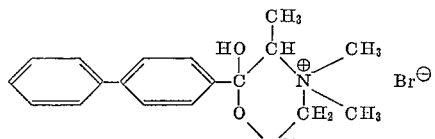

No references cited.